Nov. 10, 1964

W. C. MURRILLS 3,156,868

PHASE SEQUENCE INDICATOR INCLUDING DOUBLE
THROW SWITCHING MEANS

Filed July 15, 1960

WILLIAM C. MURRILLS

*INVENTOR.*

BY

Nov. 10, 1964

W. C. MURRILLS 3,156,868

PHASE SEQUENCE INDICATOR INCLUDING DOUBLE
THROW SWITCHING MEANS

Filed July 15, 1960

WILLIAM C. MURRILLS
*INVENTOR.*

BY Norman R. Duff

# United States Patent Office 3,156,868
Patented Nov. 10, 1964

3,156,868
PHASE SEQUENCE INDICATOR INCLUDING
DOUBLE THROW SWITCHING MEANS
William C. Murrills, 1207 University, Walla Walla, Wash.
Filed July 15, 1960, Ser. No. 43,204
2 Claims. (Cl. 324—108)

This invention relates to an electrical apparatus and more particularly to an electrical instrument for identifying the phase sequence in a three-phase electrical system and the wild leg.

While working with power circuits of a three-phase system, difficulty has been encountered in determining the phase sequence of the wires or leads in order to properly connect them into other circuits machinery or electrical apparatus. In general, it has been a trial and error proposition when connecting motors and like equipment, to see that the motor rotates in the proper direction. This necessitates numerous connections and disconnections with the necessity of cutting the power supply a similar number of times which consumes considerable periods of time, thus materially increasing the cost of doing electrical work.

More recently, complex devices have been manufactured and marketed which, by various means, indicate the phase sequence, but in general, the cost of these has been high and there have been limitations in certain aspects of operation. For example, heretofore in identifying each phase of a three-phase four-wire delta system, it has been necessary to employ two separate devices, such as a phase sequence indicator and a double test light or a phase sequence indicator and a volt meter. The present invention is designed to accomplish this function, as well as others, in a more facile manner, thus reducing the time required and materially reducing the cost of doing any such job.

Therefore, it is the primary object of the present invention to provide an electrical instrument which will positively determine each phase of a three-phase four-wire delta system and also the phase sequence.

Another object of the invention is to provide an electrical instrument in keeping with the foregoing object which will be accurate, dependable and of comparatively low cost to produce.

A feature of the invention lies in the simplicity of the construction and therefore an indicator of minimum cost.

All of the foregoing and other objects of the invention will become apparent from a study of the following specification taken in connection with the accompanying drawings wherein like characters of reference designate corresponding parts throughout the several views wherein a preferred form of the invention is shown. It should be understood, however, that the drawings and description are exemplifying only and are intended to limit the invention except insofar as it is limited by the prior art and the appended claims.

Figure 1:
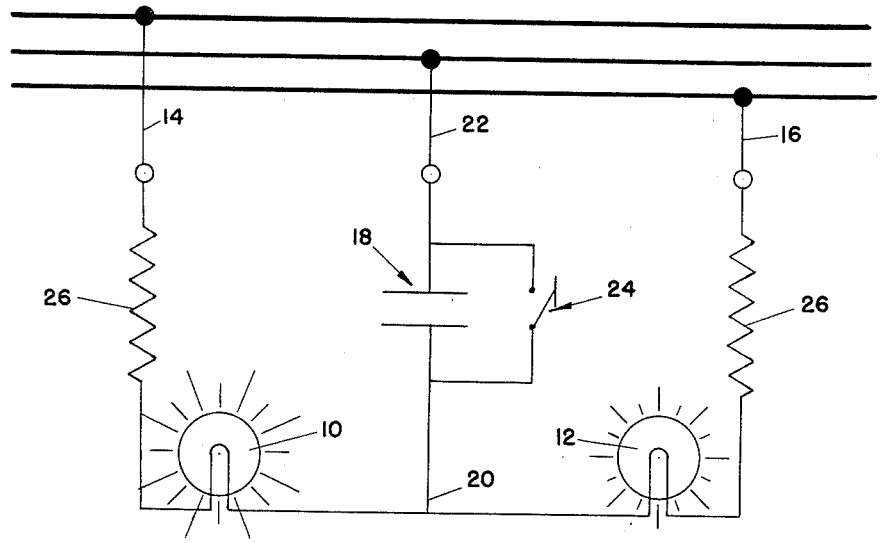
FIGURE 1 is a circuit diagram of my present invention associated with the three-phase electrical system.

Referring now in detail to the drawings, the phase sequence indicator comprises a pair of series connected incandescent visual indicators or light bulbs 10 and 12 having filaments connected to terminal probes or wires 14 and 16. A reactor 18 is connected intermediate the said indicators 10 and 12 by a center tap 20, the reactor 18 is provided with a probe or wire 22 opposed to the connection or center tap 20. Also connected parallel to the reactor 18, I provide an off-on switch 24.

For adapting the indicator for variations of use, I provide in each probe circuit a resistor 26. The indicator will function to indicate phase sequences on circuits varying from 120 volts up to 480 volts when the visual indicators 10 and 12 are each 120 volt 6-watt light bulbs, the resistors 26 are substantially 7,200 ohms each, the reactor 18 is a capacitor of substantially .25 mfd. and the resistors and capacitors are of sufficient size to handle respectively the wattages and voltages encountered within this range. It should be understood the same function may be derived by varying the resistance and lamp values or by changing the reactor from a capacitive reactor to an inductive reactor.

Figure 2:
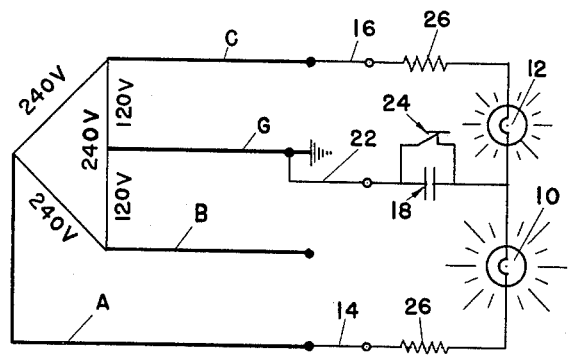
FIGURE 2 is a circuit diagram showing a three-phase four-wire delta system with the phase sequence indicator connected to determine the so-called wild or power leg.

Having reference particularly to FIGURE 2 of the drawing, I have shown a three-phase four-wire delta system in which it is desired to identify each phase wire. To accomplish this, it is first necessary to determine which one of the three wires, other than the ground wire, has the highest voltage to the ground. This wire or lead is commonly called a "wild" or "power leg." Its voltage to ground will be approximately the square root of 3, times either of the two other two voltages to ground which two will be approximately equal.

In a 240 volt, three-phase four-wire delta system, the wild leg A will be found to be approximately 208 volts to ground G while the other two "hot" leads B and C will be each approximately 120 volts to ground. The power leg A must be identified, so that no lights or motors or volt meters having a limit of 120 volts will be connected to it.

In FIGURE 2, the phase sequence indicator is shown to have its probe 22 connected to the ground lead G and the probes 14 and 16 connected to any two of the other two leads. Since there are 208 volts between ground and the power leg A and only 120 volts between ground and hot lead C, visual indicator 10 will burn more brightly than visual indicator 12, thus identifying the lead A as the power leg. If the two visual indicators 10 and 12 burn equally bright, then it would indicate that the probe 14 had been connected to wire B instead of A and the remaining unconnected wire would be the power leg. Determining the power leg is accomplished with the switch 24 in the closed position.

Figure 3:
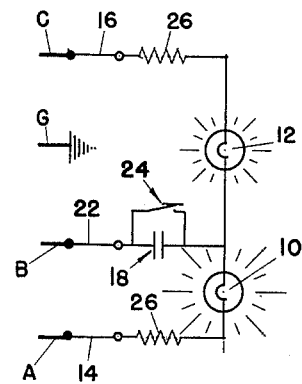
FIGURE 3 is a circuit diagram of the present invention connected to determine the phase sequence of the three-phase wires.

After the power leg A is identified, the phase sequence may be determined by connecting the probes to the three-phase leads A, B, and C. With the switch 24 in the open position as shown in FIGURE 3 of the drawing, whichever visual indicator 10 or 12 burns the brightest indicates the next successive phase from the probe 22. For example, in FIGURE 3, visual indicator 10 is shown as burning brighter than visual indicator 12 by the radiating lines, thus indicating that the next successive phase 120° from that of the lead B to which probe 22 is connected is the lead to which probe 14 is connected and then the third phase sequentially is that lead C connected to the probe 16.

In previous indicator systems, it was necessary to use a test light or volt meter to first determine the power leg A and then a sequence indicator, whereas in the present combination, all of this may be determined by the phase sequence indicator of the present invention without necessitating the change in connection of more than one probe.

There are many other uses provided for by the present invention such as, employing the device as a test light on 120 or 240 volt systems by using probe 22 with the switch 24 closed and either one of the other probes. Higher voltage such as 480 volt systems may be tested by using probes 14 and 16.

Also by connecting probe 22 to the ground lead G of a three-wire circuit and the other two probes 14 and 16 to any two leads running to the line side of a motor disconnect switch, it may be determined whether a motor winding is grounded. If upon connecting probe 22 to the ground with switch 24 closed and probes 14 and 16 to two of the three-phase leads A, B, or C, both lights burn, one probe 14 or 16 is moved to the remaining phase lead. If both lights burn each time, it indicates that the motor winding is not grounded but if only one light burns, open the motor disconnect switch. If both lights then burn, it indicates the motor has a grounded winding and should be repaired before the motor is seriously damaged. If only one light burns with the motor disconnect switch closed and this condition does not change when the motor disconnect switch is opened, this indicates the trouble is in a different motor and the test should be repeated at other motors until the motor with the grounded winding is located.

Obviously, when one can determine the phase sequence of three and four-wire three-phase deltas and three and four-wire three-phase Y's, they can determine how to replace the transformers, motors and other equipment so that everything will operate in the proper direction.

Figure 4:
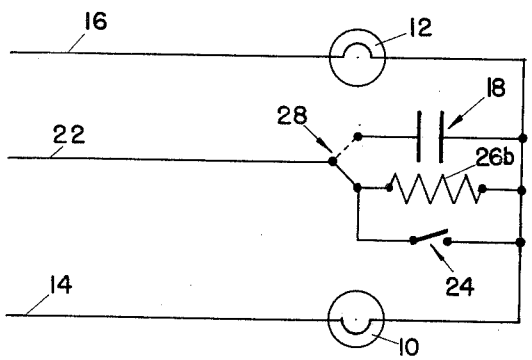
FIGURES 4, 5 and 6 are circuit diagrams showing modified species of the invention.
Figure 5:
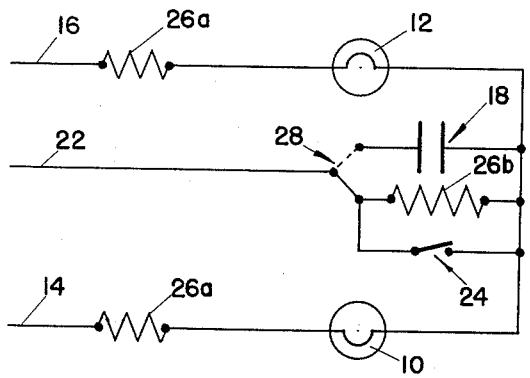
Figure 6:
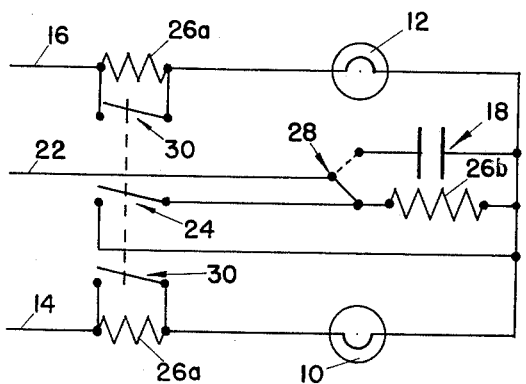

In FIGURES 4, 5 and 6 I have shown a number of modifications or species of the invention to give examples of its versatility.

In FIGURE 4, I have relocated the resistors 26 of approximately 6000 ohms value in the center tap probe 22 parallel to the reactor 18 and the off-on switch 24. At the probe side, a single-pole double-throw switch 28 is connected to alternately connect the reactor 18 and the resistor 26b. Then with 250 volt-10-watt indicators 10 and 12 any two probes can be used across 120 to 480 volts. Switch 24 is closed for use as a test light on 120 to 240 volts and opened for use as test light on 480 volts.

When resistors 26a of approximately 1500 ohms are interposed in the probes 14 and 16 and resistor 26b is substantially 7500 ohms, and the indicators 10 and 12 are substantially 250 volt-10 watt, as in FIGURE 5, the indicator can be used on circuits ranging from 120 to 600 volts. Other combinations of resistor and indicator values will effect other capabilities.

In FIGURE 6, I have shown the species of FIGURE 5 but with the modification of incorporating the switch 24 as part of a ganged three-pole single-throw switch having switching members 30—30 for by-passing resistors 26a when switch 24 is closed.

As shown in FIGURE 6, any two probes 14, 16 and 22 may be employed to test circuits from 277 to 600 volts. With switch 28 in the dotted line position the indicator may be used to show the phase sequence of circuits of the same voltage. With the ganged switches 24 and 30 closed, the indicator may be employed as a test light and alternately as a phase sequence indicator of circuits from 120 to 240 volts merely by alternating the position of switch 28.

Having thus described my invention, I claim as new and desire to secure by Letters Patent of the United States the following:

1. An electrical phase sequence indicator, comprising:
a pair of electrically sensitive filament lights electrically connected in series with a pair of opposed probes;
a reactor and a resistor, each electrically connected at one end intermediate said filament lights;
a third terminal probe; and
a double throw switch electrically connected to said third terminal probe and connecting said third terminal probe selectively and alternately to the opposed ends of said reactor and said resistors; and
an off-on switch electrically connected parallel with said resistor.

2. An electrical phase sequence indicator, comprising:
a pair of electrically sensitive filament lights electrically connected in series with a pair of opposed terminal probes and including resistors between each said light and its respective terminal probe;
a reactor, and a third resistor, each electrically connected at one end intermediate said filament lights;
a third terminal probe;
a double throw switch electrically connected to said third terminal probe and connecting said third terminal probe selectively and alternately to the opposed ends of said reactor and said third resistor;
off-on switches connected one parallel with each said resistors; and
said off-on switches being ganged to open and close simultaneously.

References Cited in the file of this patent

UNITED STATES PATENTS

| | | |
|---|---|---|
| 2,027,864 | Hand | Jan. 14, 1936 |

FOREIGN PATENTS

| | | |
|---|---|---|
| 822,134 | Germany | Nov. 22, 1951 |
| 1,141,654 | France | Mar. 18, 1957 |
| 1,197,314 | France | June 1, 1959 |

OTHER REFERENCES

Vectors of a Two Phase System, article in Electrical Review, November 19, 1948; pp. 779–780.

A Phase-Sequence Indicator Using Back-to-Back Rectifiers, article in Journal of Scientific Instruments, October 1953, pp. 375–378.